United States Patent [19]

Iida

[11] 4,065,143
[45] Dec. 27, 1977

[54] FLUID SUSPENSION SYSTEM

[75] Inventor: Akio Iida, Kawasaki, Japan

[73] Assignee: Kabushiki Kaisha Komatsu Seisakusho, Tokyo, Japan

[21] Appl. No.: 678,593

[22] Filed: Apr. 14, 1976

[30] Foreign Application Priority Data

Apr. 14, 1975 Japan ............................. 50-49282[U]
Apr. 14, 1975 Japan ............................. 50-49283[U]

[51] Int. Cl.² ............................................. B62D 61/12
[52] U.S. Cl. ................................. 280/43.23; 280/708
[58] Field of Search ............... 280/704, 708, 714, 706, 280/43, 43.17, 43.23; 267/64 A, 65 R, 65 D

[56] References Cited

U.S. PATENT DOCUMENTS

| | | | |
|---|---|---|---|
| 2,885,202 | 5/1959 | Trumper | 280/708 X |
| 3,390,895 | 7/1968 | Verdi | 280/704 |
| 3,516,683 | 6/1970 | Capgras | 280/708 |

*Primary Examiner*—Joseph F. Peters, Jr.
*Assistant Examiner*—R. Schrecengost
*Attorney, Agent, or Firm*—Armstrong, Nikaido & Marmelstein

[57] ABSTRACT

A hydropneumatic suspension system for a tractor-scraper unit or the like has a hydraulic cushioning jack connected between the vehicle body and a pivotal suspension arm supporting each wheel. The cushioning jack with an associated accumulator is selectively connected to pump pressure or drain via a height control valve for raising or lowering the vehicle body relative to the wheels. For actuation of the height control valve there is operatively connected between the valve and the suspension arm a dual cylinder mechanism comprising two unitized, axially aligned air cylinders actuated from a manual selector valve. When the manual selector valve is in neutral, all the chambers of the dual cylinder mechanism are opened to atmosphere so that the height control valve is prevented from accidental actuation as the vehicle travels over rough terrain.

4 Claims, 2 Drawing Figures

FLUID SUSPENSION SYSTEM

BACKGROUND OF THE INVENTION

This invention relates to suspension systems and more particlarly to a fluid suspension system for tractor-scraper combinations or like vehicles.

A hydraulic suspension system for tractor-scraper combinations has been suggested which comprises a jack connected between the vehicle body and a suspension frame or arm pivotally connected at one end to the vehicle body and carrying each vehicle wheel at another end, as disclosed for example in Japanese Patent Publication No. 48-16802. Associated with an accumulator to provide a cushioning system, the jack is selectively vented or supplied with hydraulic fluid via a height control valve. This height control valve is actuated by a linkage system connecting its spool to the suspension frame.

According to this prior art construction, the height control valve is easy to be actuated accidentally as the vehicle encounters irregularities in the road, with the consequent swinging motion of the suspension frame relative to the vehicle body. Although the mentioned Japanese patent employs a spring to circumvent this defect, it is insufficient to prevent the valve from unnecessary actuation, thus resulting in wasteful use of the pump pressure.

SUMMARY OF THE INVENTION

It is an object of this invention to provide a fluid suspension system whereby a vehicle body can be selectively raised or lowered relative to the wheels to provide either rigid or cushion ride conditions.

Another object of the invention is to provide a fluid suspension system whereby the vehicle body can be raised to and held at a predetermined height from the ground through a simplified procedure.

A further object of the invention is to provide a fluid suspension system including a height control valve which is protected from unnecessary actuation to prevent wasteful use of fluid pressure.

A still further object of the invention is to provide a fluid suspension system wherein the pressurized fluid from a source can be supplied to some other fluid actuated equipment of the vehicle when it is not required to raise the vehicle body.

The fluid suspension system according to this invention is perhaps best characterized by what is herein termed a dual cylinder mechanism through which the height control valve is actuated from suspension control valve means. Essentially, the dual cylinder mechanism is a combination of two opposed fluid actuated cylinders operatively connected between the height control valve and a pivotal suspension arm supporting each wheel. With the suspension control valve means in neutral, all the chambers of the dual cylinder mechanism are opened to atmosphere to protect the height control valve from accidental actuation as the vehicle travels over rough terrain.

The features which are believed to be characteristic of this invention are set forth in particular in the appended claims. The invention itself, however, both as to its organization and manner of operation, together with the additional objects and advantages thereof, will best be understood from the following description of preferred embodiments, with reference had to the accompanying drawings wherein like reference characters refer to like parts throughout.

DESCRIPTION OF THE PREFERRED EMBODIMENTS

Figure 1:
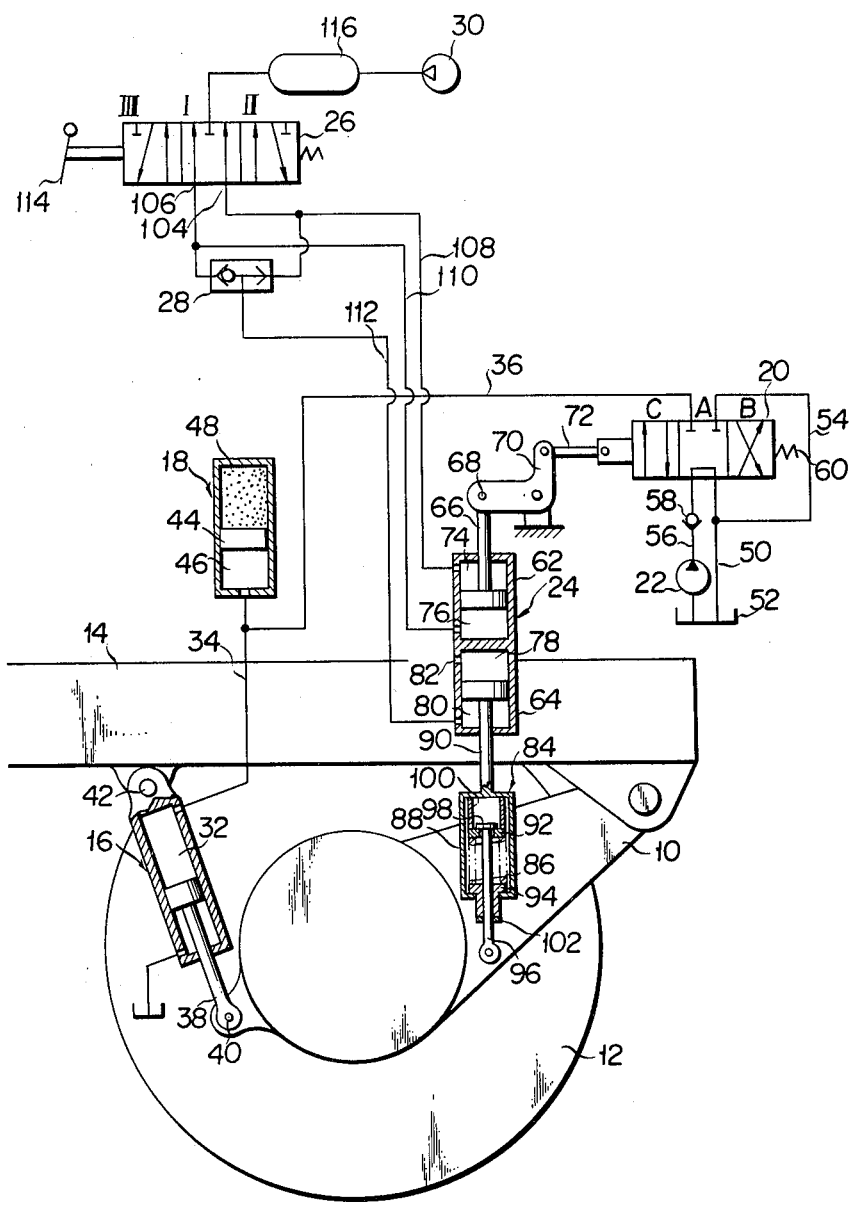
FIG. 1 illustrates diagrammatically a preferred form of the fluid suspension system according to this invention, with related parts of the vehicle shown schematically in side elevation.

In FIG. 1 of the accompanying drawings the suspension system according to the invention is shown adapted for independently supporting the wheels of an earthmoving vehicle such as, typically, a tractor-scraper combination. The vehicle has a suspension arm 10 rotatably supporting at or adjacent one end thereof each rubber tired wheel 12 of the vehicle via an axle, not shown, and pivotally connected at another end to the vehicle body represented by its main frame 14 so as to permit up-and-down motion of the vehicle body relative to the wheel.

The illustrated suspension system broadly comprises a cushioning jack 16 operatively connected between the said one end of the suspension arm 10 and the vehicle body main frame 14 and associated with an accumulator 18 to provide a cushioning system, a height control valve 20 for controlling communication between the cushioning jack and a first source of fluid under pressure such as a pump 22, a dual cylinder mechanism 24 operatively connected between the suspension arm and the height control valve for actuating the latter in a controlled manner, and suspension control valve means including a manual selector valve 26 and a shuttle valve 28 for selectively communicating a second source of fluid under pressure such as an air compressor 30 with various chambers of the dual cylinder mechanism.

The cushioning jack 16 is shown as a single-acting hydraulic cylinder defining therein a working fluid chamber 32 which is in constant communication with the accumulator 18 by way of a line 34 and further with the height control valve 20 by way of a line 36. The cushioning jack 16 has its piston rod 38 pivotally connected at 40 to the free end of the suspension arm 10 and has its head end likewise pivotally connected at 42 to the vehicle body main frame 14.

The accumulator 18 can be of the well known piston type having a floating piston 44 dividing the interior of the accumulator housing into a hydraulic fluid chamber 46 and a compressible gas chamber 48. The hydraulic fluid chamber 46 is in constant communication with the working chamber 32 of the cushioning jack 16 and with the height control valve 20.

The height control valve 20 is a three-position selector valve having a center or neutral position A, where the valve is closed, a first offset or DOWN position B, where the cushioning jack 16 and accumulator 18 are communicated with a drain line 50 leading to a reservoir 52 while pressurized fluid from the pump 22 is returned to the reservoir by way of a return line 54 and the drain line 50, and a second offset or UP position C, where the pressurized fluid from the pump is supplied to the cushioning jack and accumulator by way of output line 56, check valve 58 and lines 34 and 36. The height control valve 20 has a spring 60 urging the valve to its neutral position A.

The dual cylinder mechanism 24 is essentially in the form of two air cylinders 62 and 64 integrally connected together in axial alignment and with their head ends opposed to each other. The first air cylinder 62 has a piston rod 66 pivotally connected at 68 to one of the arms of a bell crank 70, the other arm of which is operatively connected via a link 72 to a movable element of the height control valve 20 for actuating same. The first air cylinder 62 has a first rod end chamber 74 and a first head end chamber 76, and the second air cylinder 64 has a second head end chamber 78 and a second rod end chamber 80. Of these chambers, only the second head end chamber 78 is in constant communication with atmosphere through an opening 82. The bell crank 70 is pivotally mounted on a suitable stationary part of the vehicle body.

Interposed between the dual cylinder mechanism 24 and the suspension arm 10 is a spring mechanism, generally designated 84, including a relatively heavy compression spring 86. The spring mechanism 84 further includes a cylindrical housing 88 rigidly connected at its top end to a piston rod 90 of the dual cylinder mechanism 24 extending downwardly from its second air cylinder 64. Loosely accommodated within the housing 88 are a pair of spring retainers 92 and 94 supporting the compression spring 86 therebetween and slidably mounted on a rod 96. This rod is pivotally connected at its bottom end to the suspension arm 10 and has a head 98 at its top end to engage the spring retainer 92. A tubular stop 100 is fixedly mounted within the housing 99 to limit the upward motion of the spring retainer 92 relative to the housing, and another stop 102 is fixedly mounted on the rod 96 for contact normally with a sleeve-like portion of the spring retainer 94 slidably extending through the bottom end of the housing 88.

The spring mechanism 84 of the foregoing construction is provided to allow for possible errors in the operation of the dual cylinder mechanism 24 and related means. If the supsension system operates exactly in the intended manner, therefore, the spring mechanism 84 has no function other than to connect the piston rod 90 of the dual cylinder mechanism 24 to the suspension arm 10.

The manual selector valve 26 constituting a part of the aforesaid suspension control valve means has first and second outlet ports 104 and 106 communicating with the first rod end chamber 74 and the first head end chamber 76 of the dual cylinder mechanism 24 by way of lines 108 and 110, respectively. These lines further communicates with the respective inlet ports of the shuttle valve 28, the outlet port of which is in communication with the second rod end chamber 80 of the dual cylinder mechanism 24 by way of a line 112. The shuttle valve 28 operates in the well known manner to direct compressed air into the second rod end chamber 80 at the same time with the supply of compressed air to the first rod end chamber 74 or the first head end chamber 76.

For actuation of the manual selector valve 26 there is provided a control lever 114 which can be operated by the vehicle operator. The manual selector valve 26 has a center or neutral position I, where the first and second outlet ports 104 and 106 are both opened to atmosphere, a DOWN position II, where the first outlet port 104 is communicated with the air compressor 30 via a compressed air reservoir 116 while the second outlet port 106 is opened to atmosphere, and an UP position III, where the first outlet port is opened to atmosphere while the second outlet port is communicated with the air compressor.

OPERATION

When, with the suspension system in the illustrated condition, the control lever 114 is actuated to displace the manual selector valve 26 to its DOWN position II, compressed air from the reservoir 116 is supplied to the first rod end chamber 74 of the dual cylinder mechanism 24 by way of the line 108 and also to its second rod end chamber 80 by way of the shuttle valve 28 and line 112. The pistons of the two air cylinders 62 and 64 are thus urged toward each other, with the result that the bell crank 70 is turned counterclockwise as viewed in the drawing to displace the height control valve 20 to its DOWN position B via the link 72.

The height control valve 20 when in its DOWN position B vents the working chamber 32 of the cushioning jack 16 and the accumulator 18 by way of the lines 34 and 36 and the drain line 50 to the reservoir 52. In the absence of pressure in the cushioning jack 16 and the accumulator 18, the vehicle body is permitted to lower until, as has been known heretofore, it rests directly or rigidly on the vehicle wheels. This conditions the vehicle for rigid ride suitable for earthmoving operations.

For raising the vehicle body the control lever 114 may be operated to actuate the manual selector valve 26 to its UP position III. Compressed air from the reservoir 116 is then supplied to the first head end chamber 76 of the dual cylinder mechanism 24 by way of the line 110, besides being supplied to its second rod end chamber 80 by way of the shuttle valve 28 and line 112. The piston of the first air cylinder 62 is thus displaced upwardly to cause clockwise turn of the bell crank 70, with the result that the height control valve 20 is shifted to its UP position C via the link 72.

The height control valve 20 when in its UP position C communicates the pump pressure from the output line 56 to the working chamber 32 of the cushioning jack 16 and the accumulator 18 to pressurize the cushioning system. The pressure acting on the full area of the cushioning jack piston is effective to raise the vehicle body relative to the wheel 12. With the increase in the height of the vehicle body, the suspension arm 10 turns away from its main frame 14, so that the dual cylinder mechanism 24 is displaced downwardly relative to the vehicle body to return the height control valve 20 to neutral via the bell crank 70 and the link 72.

The height control valve 20 when in its neutral position A blocks communication between the cushioning system and the pump 22. The vehicle is now conditioned for cushion ride with its body held at a predetermined height from the ground.

It is important to note that as the manual selector valve 26 is returned to a neutral setting in the cushion ride condition, the chambers 74, 76 and 80 of the dual cylinder mechanism 24 are all opened to atmosphere, in addition to the chamber 78 which is in constant communication with atmosphere. The two pistons of the dual cylinder mechanism are therefore free to slide within the respective cylinders, so that there is partially no possibility of the height control valve being actuated accidentally from its neutral position during normal dynamic motion of the vehicle traveling over rough terrain.

SECOND FORM

Figure 2:
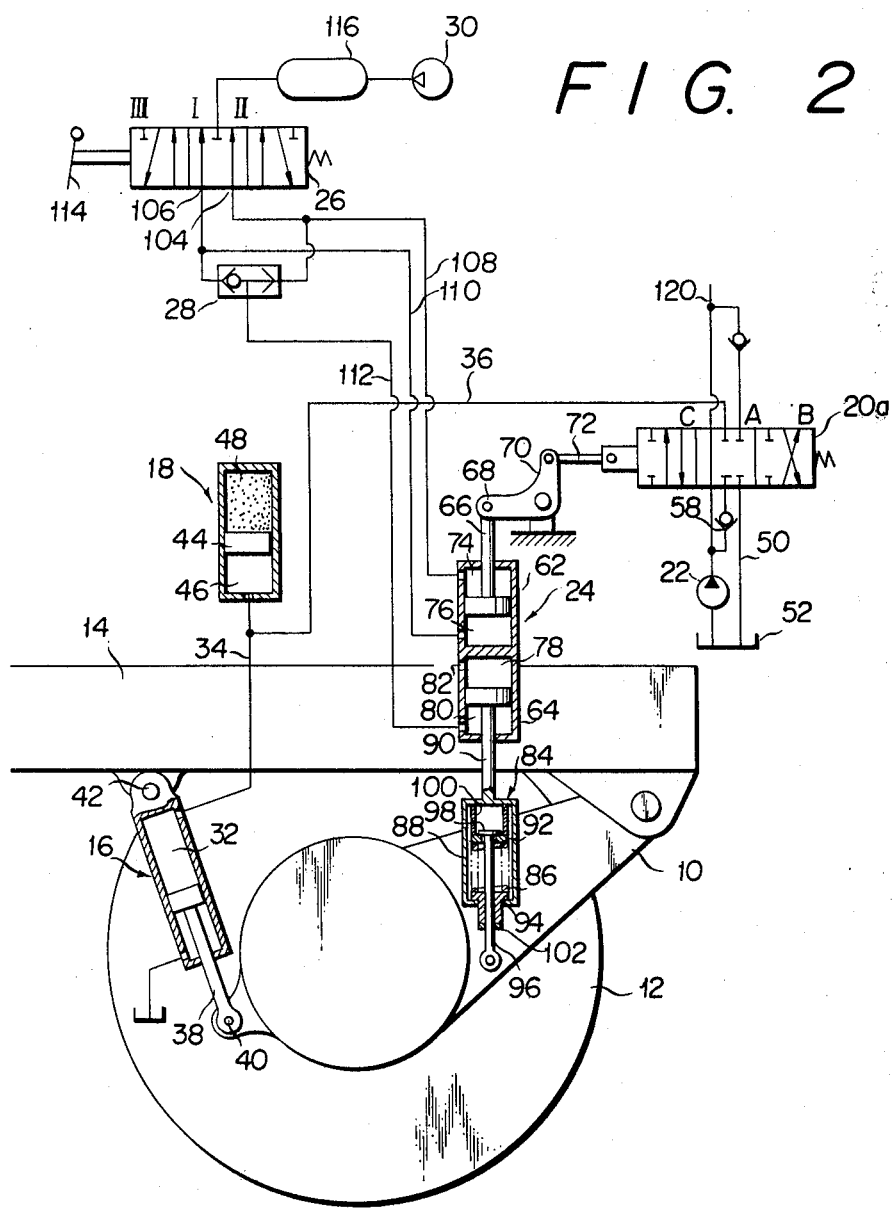
FIG. 2 is a similar representation of another preferred form of the fluid suspension system.

An alternate embodiment of the invention shown in FIG. 2 differs from the preceding embodiment only in the construction of its height control valve designated 20a. The height control valve 20a has a neutral position A, where the valve blocks communication between the pump 22 and the cushioning system comprising jack 16 and accumulator 18 but communicates the pump with a line 120 leading to some hydraulically actuated equipment of the vehicle other than the cushioning system. In a DOWN position B the height control valve communicates the cushioning system with the drain line 50 leading to the reservoir 52 and communicates the pump with the line 120. In an UP position C the height control valve communicates the pump with the cushioning system and communicates the line 120 with the drain line 50.

In this manner the pump pressure can be utilized for driving some hydraulic equipment of the vehicle when the height control valve 20a is in its positions A and B. It will be appreciated that such equipment is held out of communciation with the pump only during brief durations of time when the vehicle body is being raised for a cushion ride condition.

While the suspension system according to this invention has been shown and described hereinbefore in terms of some specific forms, it is not desired to limit the invention to the exact details disclosed. For example, each pair of vehicle wheels may be mounted on a common suspension frame pivoted to the vehicle body. This and other modifications which will readily occur to one skilled in the art are considered to fall within the scope of the invention as sought to be defined by the following claims.

What is claimed is:

1. In a fluid suspension system for a vehicle having a suspension arm rotatably supporting each wheel of the vehicle adjacent one end and pivotally connected to a vehicle body at another end so as to permit up-and-down motion of the vehicle body relative to the wheel, wherein the suspension system is of the type comprising a cushioning jack operatively connected between the vehicle body and the one end of the suspension arm, an accumulator in constant communication with the cushioning jack, and a first source of fluid under presure for supplying pressurized fluid to the cushioning jack, the combination thereof with:
   a. a height control valve operatively connected between said cushioning jack and said first source, said height control valve being normally held in a center position and displaced on actuation to either of two offset positions for communicating said cushioning jack with said first source or with a drain;
   b. dual cylinder means comprising:
      1. a first fluid actuated cylinder having a piston rod operatively connected to said height control valve for actuating same, said first cylinder having a first rod end chamber and a first head end chamber; and
      2. a second fluid actuated cylinder having a piston rod operatively connected to said suspension arm, said second cylinder having a second rod end chamber and a second head end chamber, said second head end chamber being in constant communication with atmosphere;
      3. said first and second cylinders being connected to each other with their head ends in opposed relationship;
   c. a second source of fluid under pressure; and
   d. suspension control valve means for selectively communicating said second source with said first and second rod end chambers or with said first head end chamber and said second rod end chamber and thus for actuating said height control valve to either of said two offset positions, said suspension control valve means having a neutral setting where all said chambers of said dual cylinder means are communciated with atmosphere.

2. The fluid suspension system as recited in claim 1, wherein said suspension control valve means comprises:
   a. a manual selector valve having two outlet ports in communiation with said first rod end chamber and said first head end chamber, respectively, of said dual cylinder means; and
   b. a shuttle valve having two inlet ports in communication with said outlet ports, respectively, of said manual selector valve, said shuttle valve having an outlet port in communication with said second rod end chamber of said dual cylinder means.

3. The fluid suspension system as recited in claim 1, further comprising relatively heavy spring means through which said piston rod of said second cylinder of said dual cylinder means is connected to said suspension arm.

4. The fluid suspension system as recited in claim 1, wherein said height control valve is adapted to communicate said first source with some fluid actuated equipment of the vehicle other than said cushioning jack and said accumulator except when said first source is in communication with said cushioning jack.

* * * * *